F. STITZEL.
SPRING WHEEL.
APPLICATION FILED NOV. 2, 1916.

1,233,724.

Patented July 17, 1917.
2 SHEETS—SHEET 1.

Inventor
Frederick Stitzel
by
Wm H Finnell
Attorney

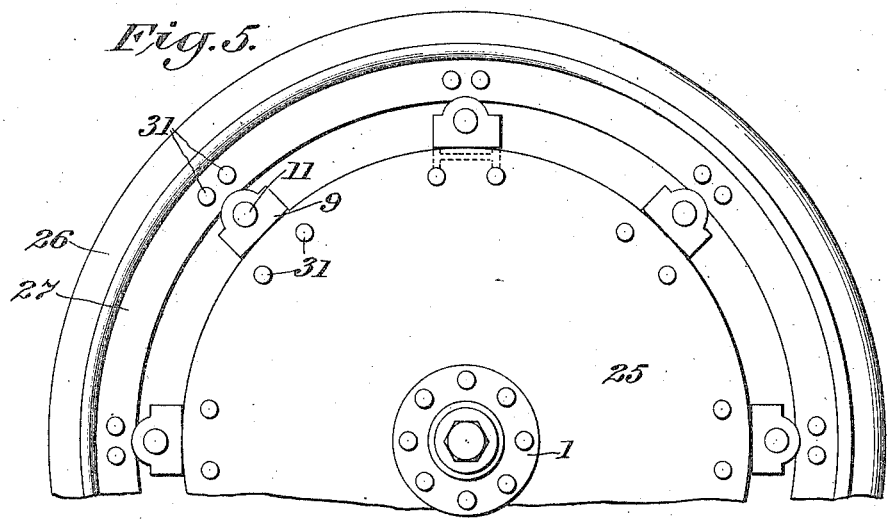
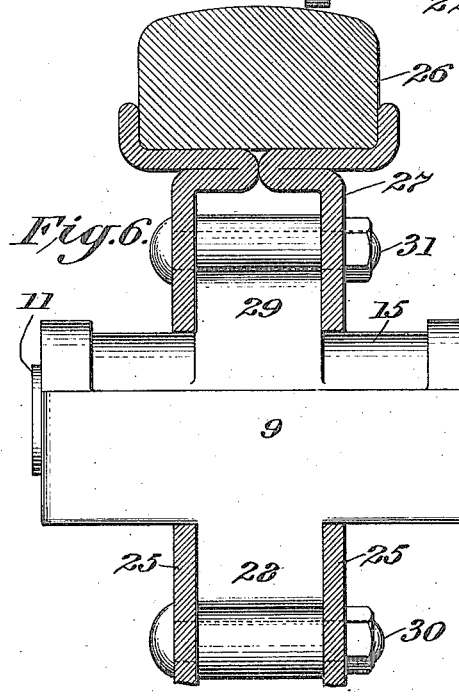
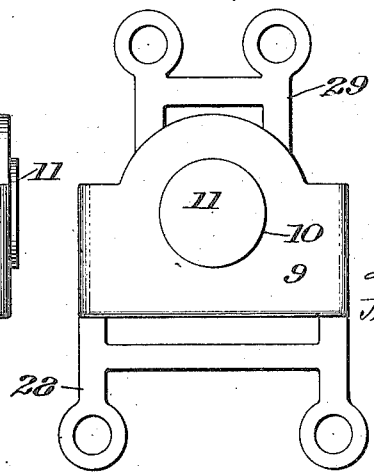

UNITED STATES PATENT OFFICE.

FREDERICK STITZEL, OF LOUISVILLE, KENTUCKY.

SPRING-WHEEL.

1,233,724.

Specification of Letters Patent.

Patented July 17, 1917.

Application filed November 2, 1916. Serial No. 129,195.

*To all whom it may concern:*

Be it known that I, FREDERICK STITZEL, a citizen of the United States, residing at Louisville, in the county of Jefferson and State of Kentucky, have invented a certain new and useful Improvement in Spring-Wheels, of which the following is a full, clear, and exact description.

This invention relates to that class of spring wheels in which there is an inner member composed of a hub, spokes or their equivalents, and a rim, all rigidly connected, and an outer member composed of a rim and a tire, and these two members connected by resilient devices, which also serve to cushion the outer member.

The object of the invention is to provide such a wheel with resilient members, each of which is a separate unit, individually accessible, arranged between the inner and outer members and connected rigidly with both, and adapted to yield radially as pressure is put upon the outer member.

The invention consists of a pair of housings, one of which is rigidly fixed to the inner member of the wheel, and the other similarly fixed to the outer member of the wheel; one of the housings, preferably that one attached to the outer member of the wheel, supporting a coiled spring having ball seats in its opposite ends, and the other housing provided with complemental ball seats, and balls interposed between the seats, so that the two housings are connected in a movable manner to effect the suspension, as it were, of the outer member of the wheel and permit it to yield radially by the compression and expansion of the spring incident to the movement of the balls on their seats, as I will proceed now to explain and finally claim.

Figure 1:
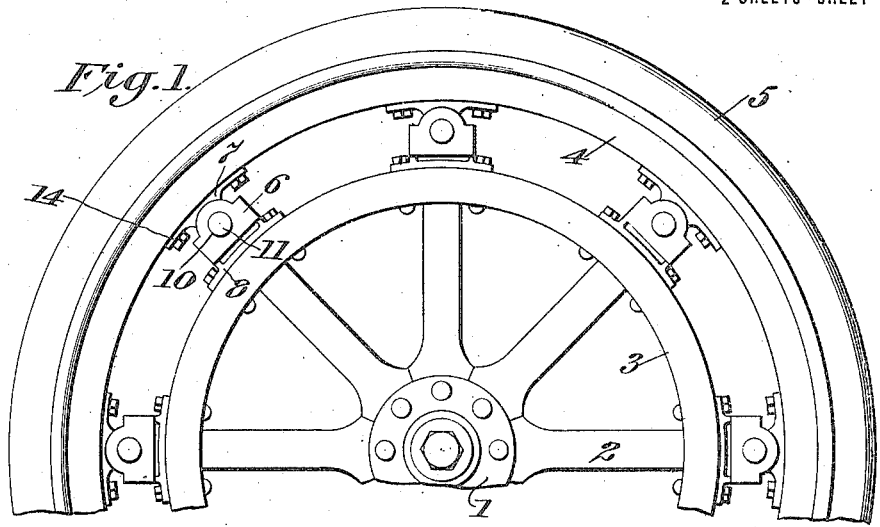
Figure 2:
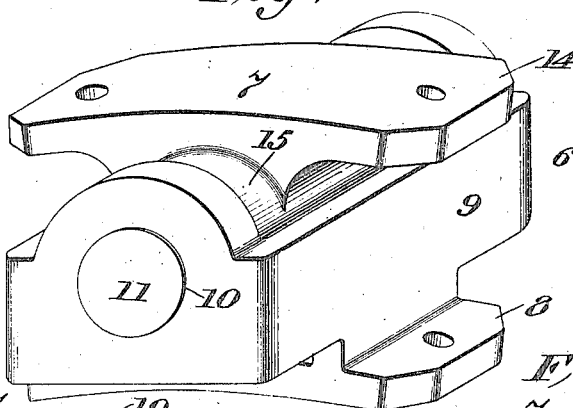
Figure 3:
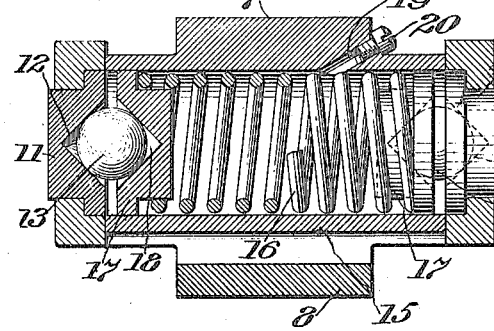
Figure 4:
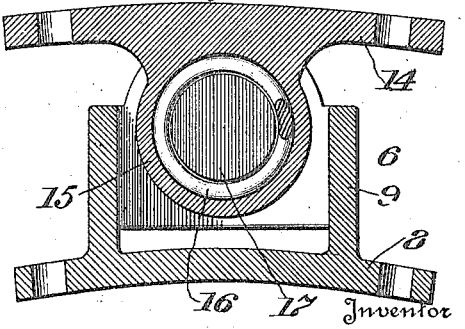

In the accompanying drawings illustrating the invention, in the several figures of which like parts are similarly designated, Figure 1 is an elevation of half of a spoked wheel with the resilient units of this invention in place. Fig. 2 is a perspective view, on a larger scale, of one of the resilient units detached; Fig. 3 is a horizontal section showing part of the spring in elevation, and Fig. 4 is a vertical section. Fig. 5 is an elevation of half of a plate or disk wheel; Fig. 6 is an elevation on a larger scale showing a modification of the resilient unit adapted for the plate wheel, and Fig. 7 is an end elevation. Fig. 8 is a plan view illustrating a tool that may be used in connecting the spring-carrying housing with the complemental housing of a unit.

As shown in Fig. 1, the invention is applied to a wheel having an inner member composed of a hub 1, spokes 2 and a rim 3, and an outer member composed of a rim 4 and a tire 5. These two wheel members are connected by means of radially arranged resilient units, composed of the housings 6 and 7 and their constituent parts next described. The housing 6 has the base flange 8, which is adapted to be applied to the periphery of the rim 3, and this base flange supports a substantially rectangular open frame 9, arranged thereon at right angles, and having sockets 10 in its opposite ends to receive the ball seats 11 which are made with angular cavities 12 to receive the balls 13. The housing 7 likewise has a base flange 14 by which it is applied to the inner periphery of the outer member, and a cylindrical socket 15 open at both ends, and arranged at right angles to the base flange. This socket contains and supports a coiled spring 16, in the ends of which are ball seats 17 having the angular cavities 18 to receive the balls 13. The housing 7 may have a hole 19 leading into its cylindrical portion for the purpose of supplying lubricant, and this hole may be stopped by a screw or other suitable stopper 20.

The cylindrical socket 15 is designed to fit snugly against the ends of the frame 9 so as to provide against lateral movement and consequent rattling, and so as to permit proper distribution of the lubricant to permit the necessary sliding movement between the socket and the ends of the frame. The balls 13 are designed to fit in their respective seats 12 and 17 in such way as to put the spring 16 under constant tension sufficient to insure the connection of the outer member of the wheel with the inner member against accidental dislocation. The yield of the springs in order to effect the cushioning of the wheel is obtained by a radial movement of the housing 7 tending to displace the balls, such displacement being resisted by the increased tension thereby put upon the springs.

Of course, the housings are connected with the springs under strong tension, and in order to effect the connection of the housings, the spring seats and spring may be held in a vise while the housing 6 is being applied, or a special tool may be used, such as shown in Fig. 8, composed of a head 21 mounted on screw-bolts 22 and these in turn having a movable head 23 adjustable by means of nuts 24 applied to the threaded ends of the screw-bolts, so as to compress the spring enough to admit of the telescoping of the two housings.

As shown in Figs. 5, 6 and 7, the invention is equally applicable to a wheel where instead of spokes the hub 1 is connected with the rim or its equivalent by means of plates or disks 25, and the tire 26 has the annular plates 27 projecting inwardly therefrom. In this case the housings may be provided with lugs 28 and 29 which are in effect the equivalents of the base flanges of the construction shown in Figs. 1 to 4, and are herein so claimed, and these lugs extend respectively between the disks 25 and the annular plates 27, and transversely arranged screw-bolts 30 and 31 are used to secure them in place. Otherwise the resilient units are of the same construction as those illustrated in detail in Figs. 2, 3 and 4, and operate in the same way.

In the disk form of wheel, as well as in the spoked form of wheel shown in Fig. 1, the resilient connections are units, complete in themselves, and entirely independent of one another and of the wheel construction, and each is accessible independently of the other, so that the assembling of the parts in the construction of the wheel is greatly facilitated, as is the repairing or replacing of any imperfect or damaged units.

Other variations in the construction details are permissible within the principle of the invention as herein claimed.

What I claim is:—

1. A resilient member for spring wheels, having a pair of housings fitted one within the other and provided with base flanges for attaching them to the wheel members, one of said housings having a spring support open at both ends and containing a coiled spring, and ball seats arranged in the opposite ends of said spring, and the other housing having a frame provided with ends against which the ends of the spring support fit snugly and slidingly and ball seats in said frame ends, and balls arranged in the said ball seats and held therein by the tension of the spring and adapted to move in their seats under tension of the spring under relative movement of the housings to cushion the wheel, and serving also to connect the housings and the parts of the wheel to which they are attached.

2. In a spring wheel, having an inner member and an outer member, a series of independent connecting units, each composed of a pair of housings, the housings provided with base flanges for connecting them with the respective wheel members, and one of the housings having a spring-supporting cylinder open at both ends and arranged at right angles to its base flange, a coiled spring therein, and ball seats arranged in the opposite ends of said spring, and the other housing having an open frame arranged at right angles to its base flange having ends against which the ends of the cylinder fit snugly and slidingly, said frame having complemental ball seats in its ends, and balls interposed between the seats in the spring and said frame ends to connect the housings and adapted to yield under tension of the spring to permit a radial movement of the housings as the wheel is put under pressure.

In testimony whereof I have hereunto set my hand this 1st day of November A. D. 1916.

FREDERICK STITZEL.

Witnesses:
 GEORGE MERCKE,
 FRANK MERCKE.